Patented Aug. 4, 1942

2,291,624

UNITED STATES PATENT OFFICE 2,291,624

PROCESS FOR IMPROVING BEER OR SIMILAR LIQUIDS

Eberhard Heimann, Berlin - Schoneberg, and Johann Friedrich Meyer, Potsdam, Germany, assignors to the firm A.-G. für Bier- und Weinprodukte, Zurich, Switzerland No Drawing. Application June 1, 1936, Serial No. 82,990. In Switzerland June 5, 1935

15 Claims. (Cl. 99—48)

This invention relates to a process for producing beer or similar liquids so that an improved taste and appearance and increased keeping qualities and stability are obtained.

The new process is particularly valuable for beer or liquids similar to beer which are prepared from malt or malt substitutes, and it facilitates and shortens the manufacturing process.

Freshly produced liquids of this kind generally have an unpleasant secondary taste which cannot be completely removed, even by long storing. This secondary taste, or fresh beer taste, is due to the existence of colloidally dissolved substances, which heretofore could not be removed in a satisfactory manner. A treatment which removes these undesirable components is not alone sufficient. Other components, which are needed to obtain a proper beer, must be retained. Moreover, the addition of further undesirable substances, during treatment, must be avoided. These different conditions are fulfilled if beer or similar beverages are treated during or after their production with aluminium silicates of the montmorillonite type. By such treatment, the dissolved substances or the substances in colloidal state, especially albumens, which have a prejudicial effect on taste, colour and keeping quality are removed, without removal of the desirable components. In this connection, the object is not merely to remove substances which render the liquid turbid but is also the production of a beer which has a high degree of stability, even when pasteurized.

Suitable forms of the montmorillonites are bleaching earth, bentonite, mixtures of the same, or forms preliminarily treated with other substances. It is for instance sufficient to stir the finished beer with a small quantity of bleaching earth, before it is filled in containers and then to let it stand until the solid substances have deposited, which requires only short time. The same treatment can be employed also at an earlier stage of the manufacturing process, for instance during mashing or worting. In addition mixing and stirring, preferably filtering is also employed.

An aluminum silicate suitable for the treatment here described is one characterized by the presence of colloid-like particles capable of swelling. Such an aluminum silicate can be employed in the raw state, or can be previously cleaned, for instance by washing, or can be used after activation by treatment with acid or by electricity, or in a roasted state. According to whether mixing or filtration treatment is selected, the operation can be carried out with powdered, granular, bulky or shaped material. A substance which has to be heated is to be shaped preferably before the heating. The heating must be carried out, for instance, above 400° C., but not at a higher temperature than 800° C., preferably in an oxidising atmosphere. The granulating can be effected also after the heating treatment.

Granular material for a filtering treatment can be used for a longer time and can be reactivated for instance with alkalies.

Concerning the selection between the various suitable forms of aluminium silicate of the montmorillonite type, the determining factor is as mentioned the content of swellable or colloid-like particles. Amongst these bentonite is best. It consists chiefly of swellable aluminium silicate with complex coatings of Na, K, Ca or Mg or several of these substances at the same time. These attached ions can be exchanged easily with each other or with hydrogen and it is therefore also possible to alter the complex coating. The composition of a typical bentonite which has proved perfectly suitable for the process according to the invention was: $SiO_2$ 62.7%, $Al_2O_3$ 19.7%, $Fe_2O_3$ 3.7%, CaO 1.2%, MgO 2.9%, $Na_2O$ 2.8%, $K_2O$ 0.4%, the remainder: water, organic substances, acid constituents 6.6%.

The effect of this bentonite has been found to be 2½ times greater than that of normal activated bleaching earth.

Because of the special activity of the bentonite or of similar colloid-like aluminium silicates possessing high swelling capacity any desired graduation in the degree of the treatment is possible. Bleaching earth and other absorbents, such as active carbon, silica gel and the like, can be rendered more effective by the addition of bentonite thereto. Inversely too strong swelling capacity of the bentonite, which in the treatment of the beer would render the mixing and separation more difficult, may be reduced by the addition of other substances and regulated as desired.

Another possibility is to employ the different forms of aluminium silicate successively. The beer is first treated in any stage of its production with any form of bleaching earth, after which follows a short treatment with bentonite, bentonite mixture or the like; or the operation is carried out in one stage with bleaching earth and in another stage with bentonite or bentonite mixtures.

Generally it is more suitable to treat the wort or mash with bleaching earth and to cause the bentonite to act upon the already fermented beer, as the bentonite possesses also a strongly clarifying effect. Besides the undesired colloidally dissolved albumens, the bentonite also removes suspended residues of albumen and yeast, whereby a separate reclarifying of the beer or other liquid is superfluous.

For facilitating the distribution and on the other hand the separation of bentonite from the liquid to be refined, the bentonite or another highly colloidal aluminium silicate may be combined with finely distributed non-swelling substances, for instance non-plastic substances, prior to its use, in such a manner that over every grain of the non-plastic substance a thin surface layer of the highly colloidal aluminium silicate is formed, for instance by intensive mixing in sufficiently fine condition. Suitable non-swelling addition substances are sand, ground as fine as possible, kieselguhr, other aluminium silicates which do not swell at all or only to a small degree, and finely porous non-plastic material. Of the latter, a material is preferably employed which as such possesses a certain absorption capacity. Bleaching earths are preferably employed, from which, by thorough extraction with acids, for instance mineral acids, the bases have been removed almost completely; or which have lost their swelling capacity by being heated to temperatures from 400° C. to 800° C. Both measures may also be employed successively. A mixture of highly colloidal aluminium silicates and fine grained non-swelling material may also be brought into suitable condition by treatment with acid or by heating.

The bleaching earths which have been thoroughly treated with acids, which have been mentioned as addition substances or as vehicles, are, however, also in themselves a highly effective adsorption medium for the improvement of beer in its various stages of production. The thorough treatment is carried out with any acids, acid salts or solutions of the same, if necessary under pressure, for instance with hydrochloric acid of 15% concentration while boiling, until no basic substances go into solution in clearly traceable quantities. The material is washed acid-free with water, dried and disintegrated, and no longer possesses any base exchange capacity. If the material is to be employed in the form of pieces or as shaped filter apparatus, the shaping must be done prior to the acid treatment. For the shaping heating up to 400° C. to 800° C. is admissible, by which the adsorption effect is not reduced. The acid treatment may be carried out if desired after the heating.

A filter body is shaped for instance of raw washed bleaching earth, burnt at 500° C. to 600° C. and then boiled in hydrochloric acid of 10% to 15% until no further basic substances, such as aluminium or iron dissolve out. The body is then washed and dried. Counterflow operation is suitable during the acid treatment.

By the treatment of mash or wort with aluminium silicates mentioned several times above, the special advantage is attained that the hops to be added in the course of the process of production is thoroughly utilized. The treatment removes colloidally dissolved substances, chiefly albumens, which combine with some of the hop constituents. It is known that the substances separating out during the boiling of hops, the so-called turbid substances, bind hop constituents and also these substances which later on separate out of the beer during the cooling or fermenting. No possibility of preventing these losses in hops existed up to the present. According to the invention aluminium silicate of the montmorillonite type is added in one of the different forms described to the mash or the unhopped wort and thereby all secondary substances are removed which are prejudicial to the beer and reduce the hops.

For instance an unhopped wort is produced by any suitable mashing process, boiled for ½ to 1 hour to separate out substances capable of coagulating and then activated roasted bleaching earth is added. After further boiling for 10 to 15 minutes and stirring, the deposited constituents are removed and hopping is then carried out in the usual manner, the total quantity of hop required being added at the same time. Instead of settling, filtration over granulous material can be employed.

In addition to, or instead of, the treatment with montmorillonite a coagulation or precipitation of the substances which are prejudicial and unnecessary may be carried out prior to the hopping with precipitants, such as tannin or lactic acid, an excess being avoided. Boiling under pressure and low cooling, in general the effect of strong temperature and pressure fluctuations and finally enzymatic preliminary treatment, for instance with papaytotin, pepsin or the like can be also employed. Also other adsorption substances, such as kaolin, kieselguhr, aluminium hydroxide, silica gel, active carbon and the like may be employed and the different processes of the preliminary treatment prior to the hopping may be combined. A reduction of the consumption of hops to ½ is obtained thereby.

The new method is distinguished by simplicity. It does not require special apparatus and saves time. By a short manufacturing process the taste of the beer is like that of old well-seasoned beer. The color is improved. Full taste, foam preservation and retention of carbonic acid remain uninfluenced. The shortening of the ripening time is particularly combined with a high degree of pasteurising stability. The beer which is produced can withstand high heating and cooling, and can stand tropical climate without becoming turbit; it is further free of the disagreeable bread-like taste and flavor which pasteurized beer possesses otherwise.

We claim:

1. A process for removing colloidally dissolved albumens of the nature of proteids, which unfavorably influence the taste, from liquids of the type of beer which are prepared from malt which comprises, bringing aluminum silicates having the structure of montmorillonite in contact with said liquids to remove the said detrimental albumens from the colloidal solution whereby liquids of good body which contain dissolved colloids and which are stable during pasteurization are obtained.

2. A process according to claim 1 wherein the said aluminum silicates are brought in contact with the said liquids during the process of their preparation.

3. In a process for producing beer from wort and hops, the step of bringing aluminum silicates of the type of montmorillonite in contact with wort prior to the addition of hops to remove colloidally dissolved albumens which unfavorably influence the taste.

4. A process according to claim 1 wherein said liquids are mixed with small quantities of the said aluminum silicates in a finely divided form, and free from the detrimental substances by separating the precipitated solid substances by decantation.

5. A process according to claim 1 wherein the said aluminum silicates are in granular form and the detrimental substances are removed from the liquid by filtering it through a bed of said aluminum silicates.

6. A process according to claim 1 wherein the said aluminum silicates have been previously treated by heating to a temperature between 400° and 800° C.

7. A process for removing colloidally dissolved albumens of the nature of proteids, which unfavorably influence the taste, from liquids of the type of beer which are prepared from malt which comprises, bringing activated bleaching earth in contact with said liquids to remove the said detrimental albumens from the colloidal solution whereby liquids of good body which contain dissolved colloids and which are stable during pasteurization are obtained.

8. A process for removing colloidally dissolved albumens of the nature of proteids, which unfavorably influence the taste, from liquids of the type of beer which are prepared from malt which comprises, bringing bentonite in contact with said liquids to remove the said detrimental albumens from the colloidal solution whereby liquids of good body which contain dissolved colloids and which are stable during pasteurization are obtained.

9. A process according to claim 1 wherein the said aluminum silicates have been previously treated with an acid solution until basic substances no longer go into solution.

10. A process for removing colloidally dissolved albumens of the nature of proteids, which unfavorably influence the taste, from liquids of the type of beer which are prepared from malt which comprises, bringing a mixture of bleaching earth and bentonite in contact with said liquids to remove the said detrimental albumens from the colloidal solution whereby liquids of good body which contain dissolved colloids and which are stable during pasteurization are obtained.

11. A process for removing colloidally dissolved albumens of the nature of proteids, which unfavorably influence the taste, from liquids of the type of beer which are prepared from malt which comprises, bringing a mixture of bleaching earth, bentonite, and other adsorbing materials in contact with said liquids to remove the said detrimental albumens from the colloidal solution whereby liquids of good body which contain dissolved colloids and which are stable during pasteurization are obtained.

12. A process for removing colloidally dissolved albumens of the nature of proteids, which unfavorably influence the taste, from liquids of the type of beer which are prepared from malt which comprises, bringing a mixture of aluminum silicates having the structure of montmorillonite having a high content of colloid-fine particles capable of swelling and a granular non-swelling non-plastic material in contact with said liquids to remove the said detrimental albumens from the colloidal solution whereby liquids of good body which contain dissolved colloids and which are stable during pasteurization are obtained.

13. A process according to claim 1 wherein said aluminum silicates are carried upon bleaching earth which has been exhaustively treated with acids to reduce its swelling properties.

14. A process according to claim 1 wherein said aluminum silicates are carried upon bleaching earth which has been heated to a temperature between 400° and 800° C. to reduce its swelling properties.

15. A process according to claim 1 wherein said aluminum silicates are brought into contact with said liquid in several successive stages.

EBERHARD HEIMANN.
JOHANN FRIEDRICH MEYER.